United States Patent [19]

Hill et al.

[11] Patent Number: 5,651,425
[45] Date of Patent: Jul. 29, 1997

[54] PASSIVE LUBRICATION DELIVERY SYSTEM AND INTEGRAL BEARING HOUSING

[75] Inventors: Jason J. Hill, Manchester; Joseph L. Tevaarwerk, Clayton, both of Mo.

[73] Assignee: Emerson Electric Co., St. Louis, Mo.

[21] Appl. No.: 578,904

[22] Filed: Dec. 27, 1995

Related U.S. Application Data

[63] Continuation-in-part of Ser. No. 303,365, Sep. 9, 1994, Pat. No. 5,480,003.

[51] Int. Cl.$^6$ .................................................. F01M 9/00
[52] U.S. Cl. ......................... 184/6.12; 184/11.2; 184/61; 74/467
[58] Field of Search ........................ 184/6.12, 11.1, 184/11.2, 11.4, 13.1, 61, 62, 63; 74/467

[56] References Cited

U.S. PATENT DOCUMENTS

| | | |
|---|---|---|
| 697,629 | 4/1902 | Keiper . |
| 1,143,307 | 6/1915 | Noyes ..................... 184/11.1 |
| 1,375,376 | 4/1921 | Fynn ...................... 184/11.1 |
| 3,029,661 | 4/1962 | Schmitter ................ 184/6.12 |
| 3,107,130 | 10/1963 | Lakey . |
| 4,057,126 | 11/1977 | Stephens ................. 184/11.1 |
| 4,231,266 | 11/1980 | Nishikawa et al. ......... 184/11.1 |
| 4,337,984 | 7/1982 | Shaffer . |
| 4,359,142 | 11/1982 | Schultz .................. 184/6.12 |
| 4,488,855 | 12/1984 | Butterworth et al. . |
| 4,547,138 | 10/1985 | Mabe et al. . |
| 4,615,231 | 10/1986 | Takahashi ............... 184/6.12 |
| 4,623,306 | 11/1986 | Nakamura et al. . |
| 4,648,485 | 3/1987 | Kovaleski . |
| 4,745,816 | 5/1988 | Horiuchi et al. . |
| 4,824,344 | 4/1989 | Kimura et al. . |
| 4,879,921 | 11/1989 | Asada et al. ............. 184/11.1 |
| 4,899,704 | 2/1990 | Kronich . |
| 5,064,025 | 11/1991 | Richards . |
| 5,205,654 | 4/1993 | Zeller . |
| 5,411,116 | 5/1995 | Kish et al. .............. 184/6.12 |

FOREIGN PATENT DOCUMENTS

| | | | |
|---|---|---|---|
| 978872 | 12/1975 | Canada ................... 184/6.12 |
| 439703 | 6/1912 | France . |
| 906394 | 3/1954 | Germany . |
| 758758 | 10/1956 | United Kingdom . |
| 1060387 | 3/1967 | United Kingdom . |
| 1410526 | 6/1976 | United Kingdom . |

OTHER PUBLICATIONS

Acetal by Jones, *Modern Plastics Encyclopedia*, 1989, p. 19.
Nylon by Kohan and Ward, *Modern Plastics Encyclopedia*, 1989, pp. 30–31.

*Primary Examiner*—Thomas E. Denion
*Attorney, Agent, or Firm*—Howell & Haferkamp, L.C.

[57] ABSTRACT

A bearing lubrication system in which a shaft is journaled for rotation in an integral bearing in a gear box, the bearing being primarily loaded through less than its full circumference, leaving an unloaded reach of the bearing, the bearing being interrupted through a substantial arc in at least a portion of the unloaded reach to define a gap in the bearing through which lubricant travels, is provided with a fixed scoop for channeling lubricant into the gap. The bearing is a solid bearing, of a piece with a gear box housing, as is the scoop.

40 Claims, 5 Drawing Sheets

PASSIVE LUBRICATION DELIVERY SYSTEM AND INTEGRAL BEARING HOUSING

This is a continuation-in-part application of patent application Ser. No. 08/303,365, filed Sep. 9, 1994 and now U.S. Pat. No. 5,480,003.

BACKGROUND OF THE INVENTION

This invention has particular, but not exclusive application to gear boxes in which a multiplicity of gears, intermeshing with one another, are off set vertically from one another. In such gear boxes, lubrication of the upper gears and bearings has always been a problem. Lubricant can be pumped to the upper gear shaft bearings and to the gears themselves, but that requires an active mechanism. The gear case can be completely filled with oil, but that requires either assiduous attention to the oil level or an external reservoir, and multiplies the problems of leakage. The housings of such gear boxes are frequently made of cast iron or aluminum, and the bearings themselves have been either bushed or rolling element type bearings. The gears have generally been made of metal, and are subject to breakage if the bearings seize or the gears themselves are not properly lubricated.

It is an object of the invention to provide a passive bearing lubrication system that provides adequate lubrication to all of the bearings of a multi-gear housing from the rotation of the gears in the housing.

Other objects will become apparent to those skilled in the art in the light of the following description and accompanying drawing.

SUMMARY OF THE INVENTION

In accordance with this invention, generally stated, in a bearing lubrication system in which a shaft is journaled for rotation in a bearing, in a gear box, the bearing being primarily loaded through less than its full circumference, leaving an unloaded reach of the bearing, the bearing is interrupted through a substantial arc in at least a portion of the unloaded reach to define a gap through which lubricant travels. A scoop, in the form of a ledge, preferably integral with the housing inner wall, channels lubricant into the gap. The gap and the scoop serve the double function of providing lubricant to the journal, and of circulating the lubricant. Preferably, the lubricant is in the form of a semi-fluid, a light grease, which not only provides excellent lubrication, but is less liable than the usual lubricating oil to leak from the seals around the input and output shafts or between parts of the gear housing. The scoops associated with unidirectional gears, are preferably made in such a way as to provide a trap for wear debris. The lubrication system is so efficient that the bearings can be made integral with the housing, which is preferably made of an alloy with greater lubricity than iron or aluminum.

In a gear box in which the gears are intended to be run in either direction, as in a hospital bed adjusting mechanism, for example, the scoop has a general V-shaped configuration. In a unidirectional gear box, the scoop preferably takes the form of a spiral oriented in such a way that the rotation of a gear in the housing deposits lubricant onto the spiral and the rotational action of the gear promotes lubricant toward the center of the spiral, meaning that the direction of rotation of the gear adjacent the spiral scoop pushes the lubricant along the scoop toward the bearing. Additionally, the lubricant runs down the spiral and into the bearing gap by gravitation. The gears themselves may be provided with paddles projecting axially from a web between a hub of the gear and the gear teeth, the paddles enhancing the ability of the gears to deposit lubricant onto the scoop. The scoop or ledge may also have an edge configuration that compliments the shape of the side of the gear and positions the edge in close proximity to the side of the gear.

DETAILED DESCRIPTION OF THE PREFERRED EMBODIMENT

Figures 1, 8, 9:
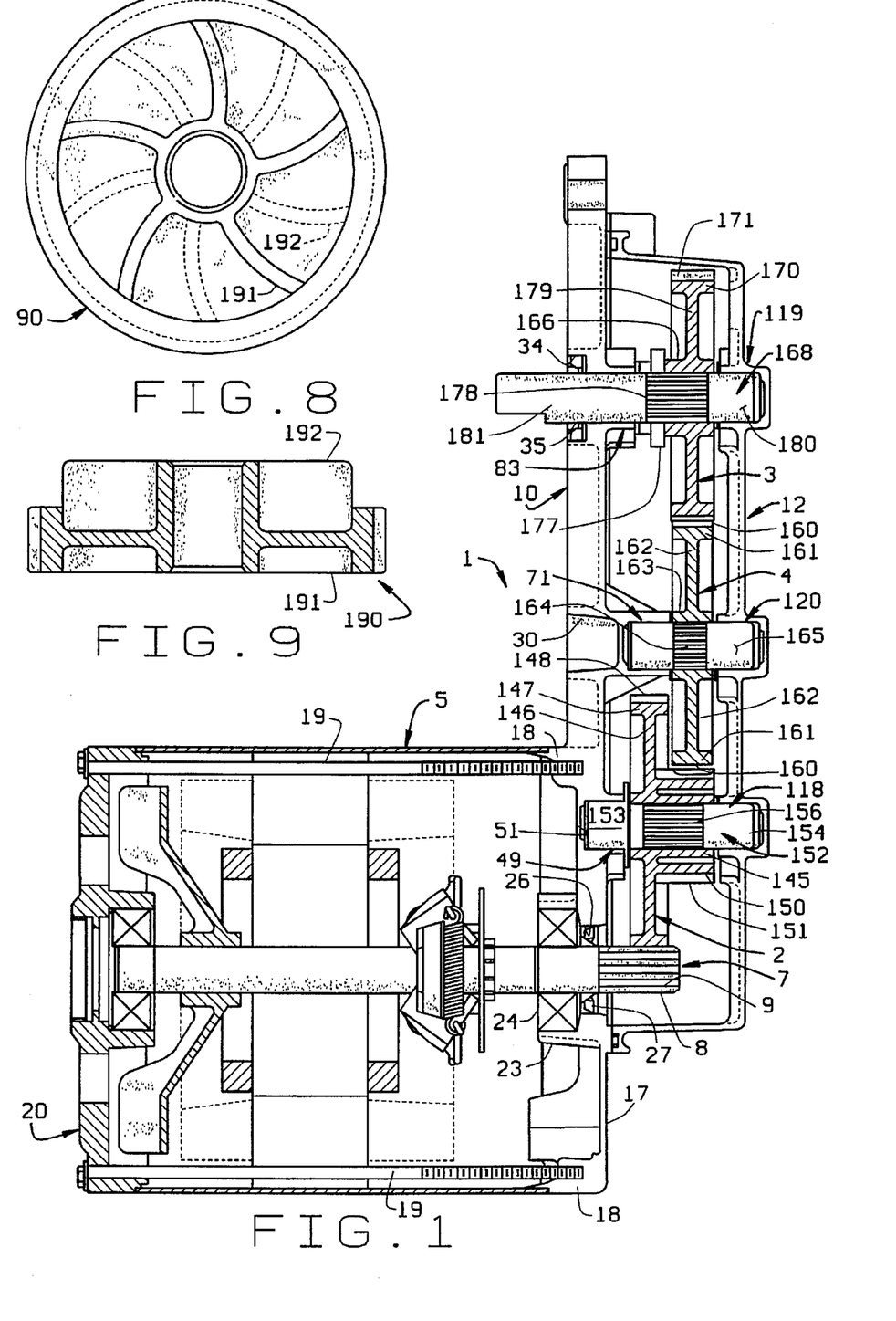
FIG. 1 is a view, partly cut away and partly in section, showing a gear reducer incorporating one illustrative embodiment of the lubrication system of this invention.
FIG. 8 is a view in side elevation of a second embodiment of a gear of the invention.
FIG. 9 is a sectional view taken diametrically through FIG. 8.

Referring now to FIG. 1, reference numeral 1 indicates a gear box containing an input gear 2, an output gear 3, and an idler gear 4. In this embodiment, a motor 5 is bolted to the gear box. The motor 5 has a shaft 7, on the projecting end of which is a drive gear 8 that extends into the interior of the gear box 1. The gear box and motor constitute a gear reducer.

The gear box 1 is made up of a gear housing cover 10 and a gear housing 12. The cover 10 has a motor mounting plate 17 that constitutes an inner end shield of the motor 5. The mounting plate 17 has bolt bosses 18, internally threaded to receive threaded ends of through-bolts 19, which extend through an outer end shield 20.

Referring now to FIGS. 1, 2, 3 and 4, an external side 15 of the cover 10 has a bearing ring 23, in which a motor bearing 24 is seated, and a seal ring 26, in which a lubricant seal 27 is seated.

Figure 2:
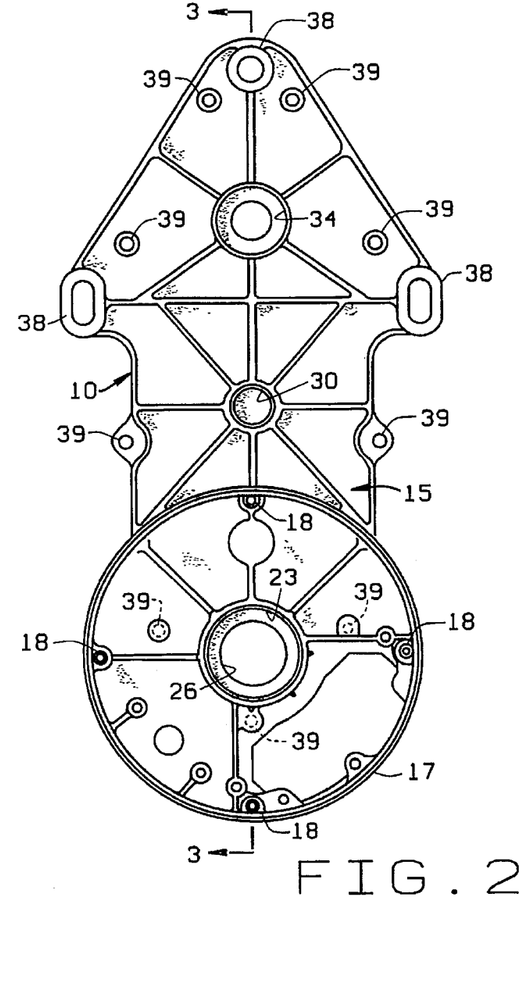
FIG. 2 is a view in rear elevation of the gear housing cover of the gear box of FIG. 1.
Figure 3:
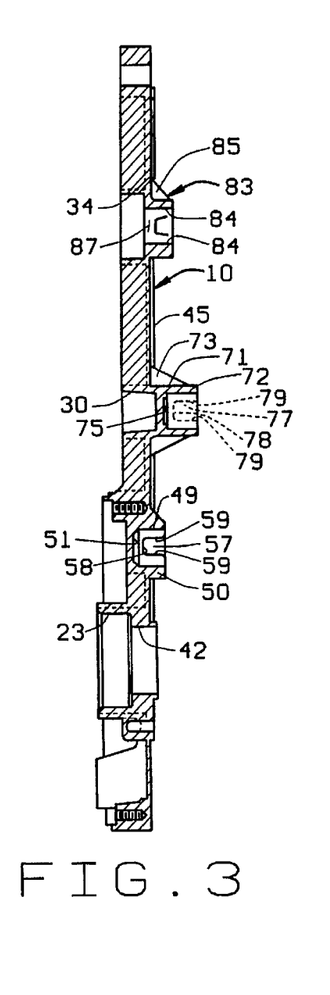
FIG. 3 is a sectional view taken along the line 3—3 of FIG. 2.
Figure 4:
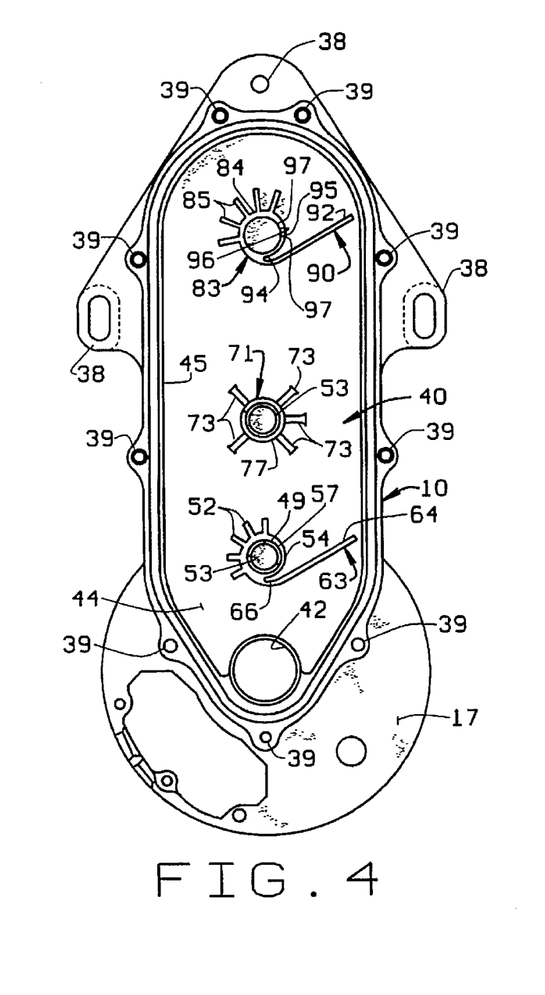
FIG. 4 is a view in front elevation of the gear housing cover shown in FIGS. 2 and 3.

A blind, cup-shaped idler gear locator 30 is positioned vertically above the seal ring 23 and above the motor plate 17. An output shaft seal ring 34, in which an output shaft seal 35 is seated, is vertically aligned with the center lines of the input shaft seal ring 26 and the locator 30. Stiffener ribs are cast into the outer surface of the external side 15, to provide reinforcement and rigidity to the seal rings and locator. Gear box mounting bolt hole ears 38 are provided to permit the entire gear reducer to be mounted on a machine. Internally threaded assembly bolt bosses 39 are provided to permit the assembly of the gear box, as is described hereinafter.

An interior 40 of the cover 10 has formed in and on it an input shaft passage 42, located in a reservoir or sump section 44. The reservoir section 44, and the interior of the gear box are defined in part by a tongue or rib 45. The open mouths of the assembly bolt bosses 39 are positioned outboard of the tongue 45.

Figure 14:
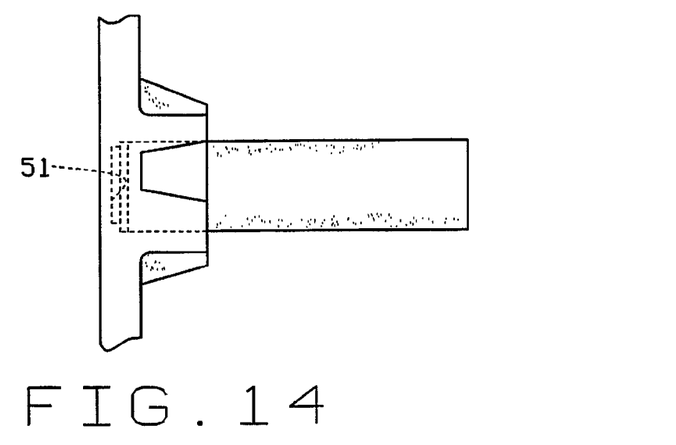
FIG. 14 is a fragmentary view in side elevation of a further embodiment of the bearing and a shaft.

An input gear bearing 49 is cast as one piece with the cover 10. The input bearing is defined by a side wall 50, and a closed bottom wall 51. The side wall 50 is strengthened and stiffened by gussets 52, which are positioned around a loaded side 53 of the bearing. Diametrically opposite the load side 53, the bearing has an unloaded side 54 in which a gap 57 or aperture is provided. The gap 57 is defined by a bottom edge 58 and side edges 59. The bottom edge 58 of the gap 57 lies above the bottom 51 of the bearing, as shown in FIGS. 3 and 14, to provide a bearing surface in the inside surface of the side wall between the bottom edge and the bottom wall. The side edges 59 diverge toward an open mouth of the gap that extends through the outer edge of the bearing side wall 49. The divergence of the edges 59 influences the rate of circulation of a given lubricant at any given speed of rotation of the gears. A draft of 5° has been found satisfactory with the lubricant of choice, but the optimum draft will vary with the type of lubricant, the speed of rotation of the gears, and other factors.

An input gear bearing ledge or scoop 63 is formed integral with the cover interior 40. The scoop 63 of this embodiment is in effect an attenuated spiral ledge, the outer reach of which is a substantially linear ledge 64, tangent to a circle concentric with the bearing 49 but of a larger diameter. At its inner end, the ledge is curved toward and is Joined to a side wall of the bearing. It meets the bearing outside wall below the gap 57, to form a pocket 66. The shafts of the input, idler and output gears are parallel with one another transversely of the gear box and are aligned vertically. The input, idler and output bearings in which the shafts are journaled are of necessity similarly oriented. The ledge 64 in this embodiment is of substantially the same height as the bearing, and extends at an angle of about 30° from the horizontal, i.e. from a perpendicular from the vertical plane defined by the axes of rotation of the shafts. The ledge 64 extends to a point near but clear of the rib 45. In the direction in which FIG. 4 is viewed, the drive gear 8 rotates counterclockwise, driving the input gear 2 clockwise. Lubricant carried by the gear 2 is therefore directed onto and promoted along the ledge 64 in the direction of the pocket 66 and gap 57. What is meant by "promoted" is that, due to the ledge 64 approaching the bearing 49 tangentially and due to the clockwise rotation of the input gear 2 past the ledge 64, a component of the force of the rotating gear exerted on the lubricant deposited on the ledge pushes the lubricant along the ledge toward the bearing. Additionally, depending on the orientation of the ledge, the lubricant is moved along the ledge by gravitation. Also, lubricant that is moved by gravity down the interior side 40 of the cover 10 vertically above the ledge will be caught by the ledge 64 and directed by it to the pocket 66 and the gap 57.

An idler bearing 71 is offset inwardly from the input bearing 49, as shown clearly in FIGS. 1 and 3. The idler bearing has a side wall 72 and a bottom wall. Gussets 73, of necessity higher than the gussets 52 of the input bearing, are positioned around a load side 53 of the bearing. A gap or aperture 77 in an unloaded reach of the side wall 72 is defined by a bottom edge 78, and side edges 79. These are shaped and positioned in the same way as the edges 58 and 59 of the input bearing 49, and, as in the input bearing, the bottom edge of the gap 77 is above the bottom wall 75, to leave a bearing surface between the bottom edge and the bottom wall.

An output bearing 83 has a side wall 84, and gussets 85 around a loaded side. The bearing 83 has no bottom wall, but has an output shaft opening 87, concentric with seal ring 34. The output bearing has a scoop 90, with a ledge 92 approximately parallel with the ledge 64 of the scoop 63. Like the scoop 63, the scoop 90 is of substantially the same height as the bearing 83, and extends near but clear of the rib 45. It also has a pocket 94, located below a gap or aperture 95, defined by a bottom edge 96 and side edges 97 substantially similar to the bottom edge 58 and side edges 59 of the gap in the input shaft bearing side wall.

Referring now to FIGS. 1, 5, 6 and 7, for a description of the gear housing 12, the gear housing is in the form of an open bottomed box, with an outside wall forming the top of the box, and a side wall 106. Unlike the exterior surface of the gear housing cover, the external surface of the outside wall 100 is planar, interrupted only by thimbles 101, 102 and 103. The thimble 101 constitutes a portion of a side wall 123 of an input gear bearing, and a bottom wall 124 of the input gear bearing. The portion of the side wall 123 on the inside of the wall 100 is provided with a gap or aperture 130, which is substantially the same as the aperture 57 in the input bearing of the cover 10. The input bearing 118 is also provided with a scoop 133, a mirror image of the scoop 63 of the input bearing 49.

Figure 5:
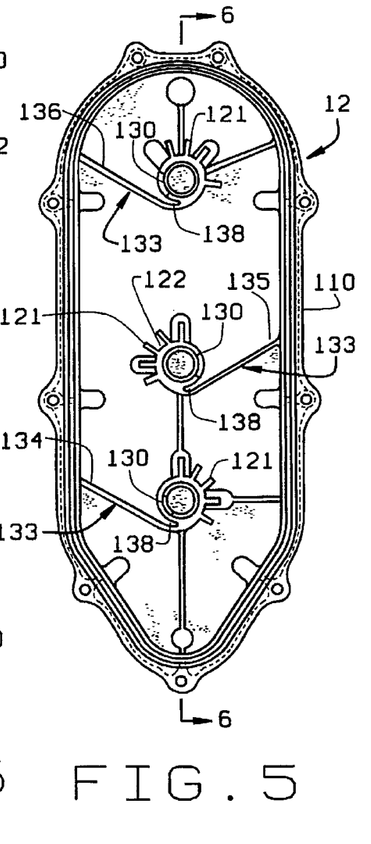
FIG. 5 is a view in elevation, viewed from left to right in FIG. 1, of the gear housing of FIG. 1.
Figures 6, 7, 10, 11:
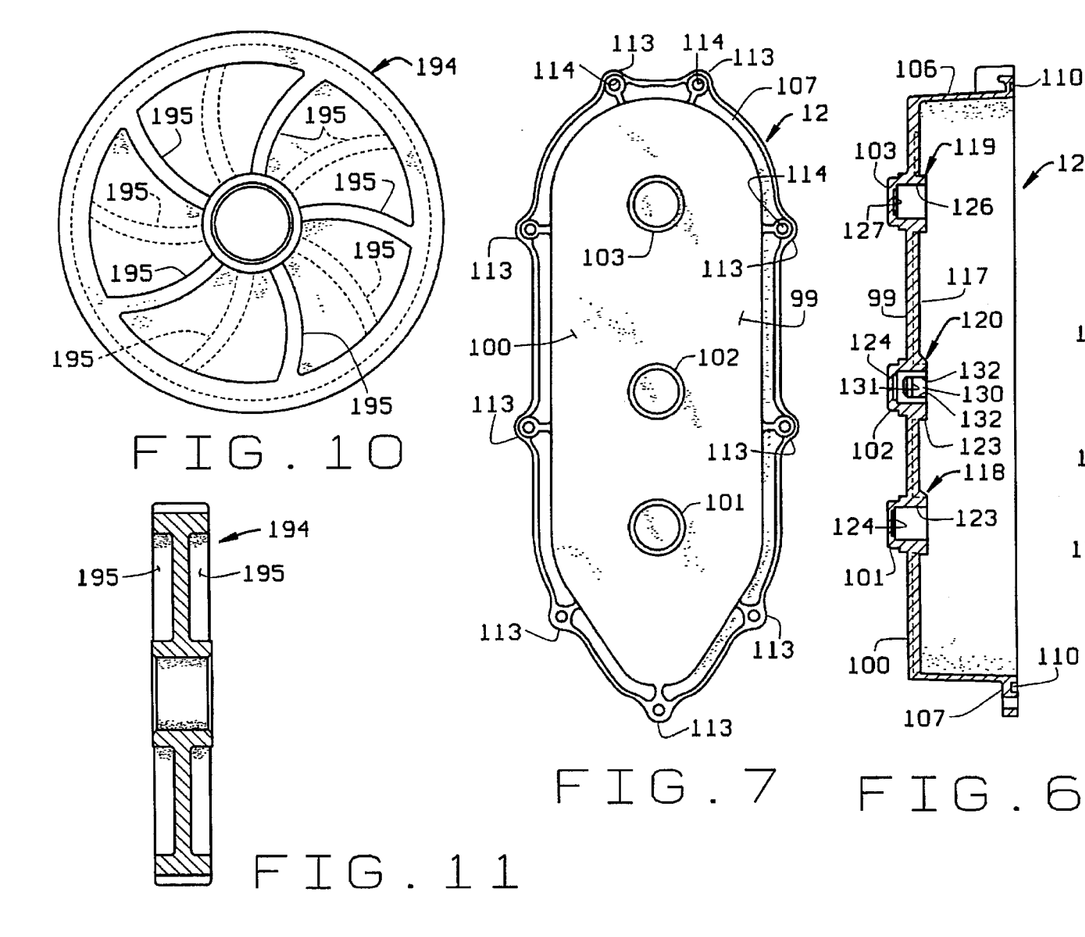
FIG. 6 is a sectional view taken along the line 6—6 of FIG. 5.
FIG. 7 is a view in elevation, viewed from right to left in FIG. 1, of the gear housing of FIGS. 5 and 6.
FIG. 10 is a sectional view in side elevation of a second embodiment of gear.
FIG. 11 is a diametric sectional view of the gear shown in FIG. 10.

An idler gear bearing 120 has a side wall 123, and a bottom wall 124. The side wall has gussets 121 on a loaded side 122, and a gap or aperture 130, defined by a bottom edge 131 and side edges 132. The aperture 130 is the same in form and position as the aperture 130 in the input bearing side wall. Unlike the idler bearing 71 on the cover, the idler bearing 120 of the gear housing side does have a scoop 133, with a ledge 135 and a pocket 138. The ledge 135 extends at a 30° angle from the horizontal, but in the opposite direction from the ledge 134 of the input bearing 118, because the idler gear rotates in the opposite direction from the input gear.

An output bearing 119 has a side wall 126 and a bottom wall 127. It also has a gap 130, of the same character as the gaps 130 of the input and idler bearings, a scoop 133, a ledge 136, parallel with the ledge 134, and a pocket 138 just below the aperture 130. The side wall 126 has stiffening gussets 121 on a loaded side.

Referring now to FIG. 1, the input gear 2 has a hub 145, a rim 147 and a web 146 extending uninterruptedly between the hub 145 and the rim 147. Gear teeth 148 project radially from the rim 147. A drive or reduction gear 150 is of a piece with the web 146 and projects axially over a portion of the hub 145. The gear 150 has gear teeth 151. The teeth 148 of the gear 2 mesh with the teeth 9 of the drive gear 8 of the motor shaft 7. The teeth 151 of the drive or reduction gear 150 mesh with teeth 160 of the idler gear 4. The input gear hub 145 is pressed onto a knurled or splined section 156 of a shaft 152. A journal section 153 of the shaft 152 is journaled in the input bearing 49; a journal end 154 of the shaft 152 is journaled in the bearing 118 in the housing 12. The spacing of planar facing surfaces of the bearings 49 and 118 is such that the hub 145 fits closely but readily rotatably between them.

The idler gear 4 has a hub 163 which is symmetrical about a web 162, and a rim 161 from which teeth 160 project. The idler gear 4 is pressed onto a knurled or splined section 164 of a shaft 165, journal ends of which are journaled in bearings 71 and 120. The length of the bearing 71 is such as to position the idler gear 4 outboard of the input gear 2, as shown clearly in FIG. 1.

The output gear 3 has a hub 166, asymmetrical with respect to a web 179, extending between the hub and a rim 170. The hub 166 is longer on the side facing the bearing 83, and is pinned to a shaft 168, as well as being pressed on to a knurled or splined section 178. The shaft 168 is an output shaft, and is journaled at one end 180 in the bearing 119 in the gear housing, and projects as its other end 181 through the bearing 83 in which it is journaled, through the seal 35, and sufficiently far to permit its being coupled to whatever is to be driven. In the embodiment shown, the projecting output end 181 is shown as having a flat. The shaft 168 is, in this embodiment, pinned to the hub 166 by means of a roll pin 177. It can, of course, be keyed or splined to the shaft, but the gear must be secured sufficiently to ensure that it drives the shaft 168 without slippage, unless there is a clutch-like arrangement, responding to a predetermined amount of torque. The roll pin 177 could also be a shear pin to protect the gears and motors and the driven mechanism from damage.

Referring now to FIGS. 8 and 9 for another embodiment of output gear, gear 190, identical in all other respects to the output gear 3, is provided with paddles 191 on the side toward the bearing 119 and paddles 192 on the side adjacent the bearing 83. The paddles are curved from the hub to the rim, in a direction toward the scoops 90 and 13. As can be seen, the paddles 193 are wider, axially, than the paddles 191, so as to put them close to the scoop 90 over and around the long, pinned section of the hub 166.

In FIGS. 10 and 11, a modified idler gear is shown, identical with the idler gear 4 except for the provision, in gear 194 of paddles 195 which, like the paddles 191 and 192 are curved in a direction toward the scoop 133. The paddles 195 are symmetrical about the web.

The paddles of the gears shown in FIGS. 8–11 enhance the ability of the rotating gears to "promote" the movement of the lubricant along the ledge toward the bearing. The spiral curvature of the paddles passing by the ledges as the gears rotate pushes the lubricant along the ledges toward their respective bearings.

Figure 15:
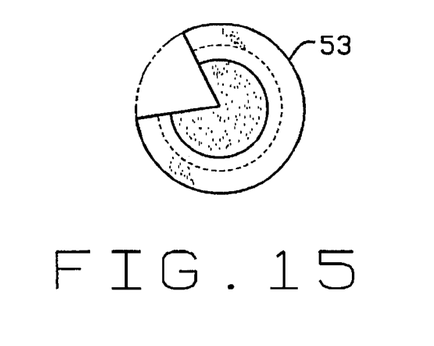
FIG. 15 is a diagrammatic view in front elevation of the bearing shown in FIG. 14.

Referring now to FIGS. 14 and 15, in FIG. 14, the shaft can be that of any of the gears. The shaft extends near but not against the bottom wall of the bearing, but beyond the bottom edge of the gap. The side edges of the gap are shown with a somewhat exaggerated flare. The path of grease in the aperture has been found to pass down one side edge, across the bottom edge and up the other side edge, hence, out of the opening. This flow path ensures not only that the lubricant reaches the bearing and journal, but that fresh lubricant is supplied continuously, and that wear debris is flushed from the bearing. It has also been found that the pocket of the spiral scoop serves the double function of retaining some of the lubricant as a kind of reservoir, and of collecting wear debris.

In FIG. 15, the segment of the side wall that is cut out to form the opening is shown as encompassing approximately 60° of arc, as has been explained, on the unloaded side of the bearing.

Figure 12:
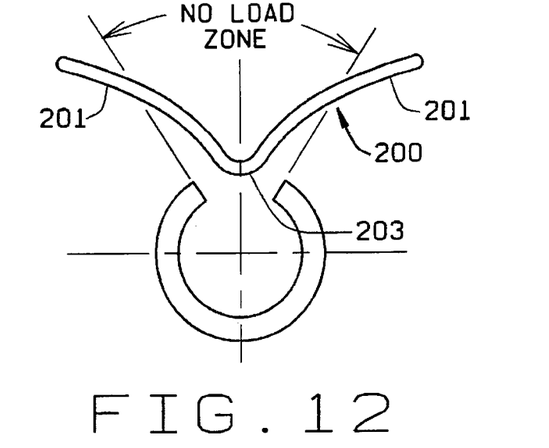
FIG. 12 is a view in elevation of another embodiment of the scoop ledge and bearing of the invention.
Figure 13:
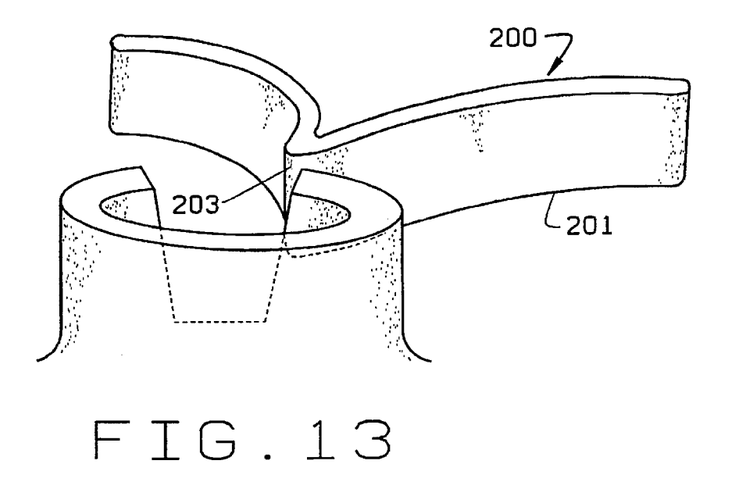
FIG. 13 is a fragmentary view in perspective of the scoop and bearing shown in FIG. 12.

Referring now to FIGS. 12 and 14, a modified scoop is shown, adapted for use with a bi-directional gear reducer. Although the generally V-shaped or gull wing scoop 200, with its symmetrically arranged arcuate wings 201 and apex or terminus 203 directed midway between the side edges of the gap provides no pocket, it does direct lubricant into the opening of the bearing. Bi-directional gear boxes are necessarily intermittent in operation, and in such applications as hospital bed adjusting mechanisms, are not operated for long periods at a stretch. Under those circumstances, the gull wing scoop works quite satisfactorily.

It will be observed from the drawings that all of the bearings are cast as one piece with their respective gear box elements. It has been found that, when the lubrication system of this invention is employed, the gear box can be made of a reasonably lubricious alloy. This construction provides a substantial economy in production, but at the same time the bearings produce results equal to or superior to porous sintered bearings, for example.

The lubricant is conducted by the scoops 133 on the gear housing side, and by the scoops 63 and 90 on the cover side into their respective bearings. It has been found in practice that the idler bearing 71 on the cover side is adequately lubricated by the lubricant that is carried by the input gear to the gap 130, without a scoop. However, a scoop can be provided for the idler gear 71 as well.

FIGS. 16–19 illustrate a further embodiment of the passive lubrication delivery system of the invention. This embodiment of the invention is illustrated in the figures as being employed in a gear housing cover 310 and a gear housing 311 that are substantially identical to the gear housing cover 10 and gear housing 12 employed with the previous embodiment of the invention except for the differences to be discussed below. It should be understood that, although the system of the invention is described as being employed in a specific housing, the housing should not be interpreted as a limiting environment of the invention. The constructions of the gears and the lubricant conducting ledges or scoops to be described may be employed in a variety of different types of gear housings to lubricant shaft bearings of those gear housings.

Figures 16, 17:
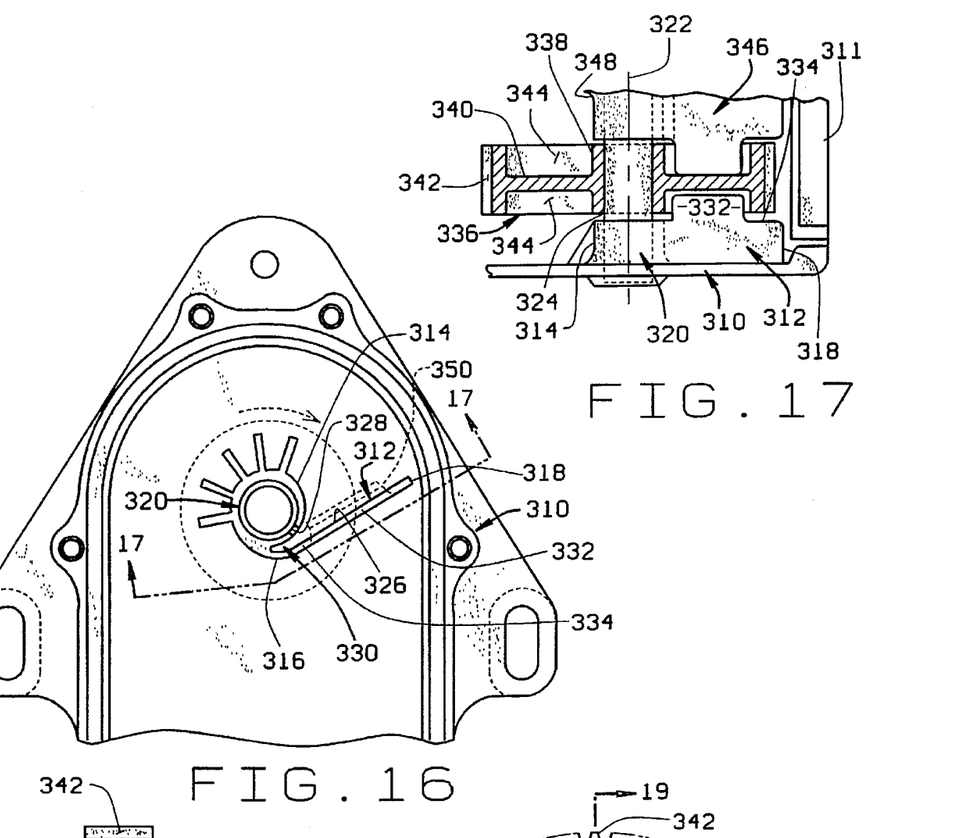
FIG. 16 is a partial view of a further embodiment of the scoop ledge of the invention.
FIG. 17 is a partial view taken along the line 17—17 of FIG. 16.
Figure 18:
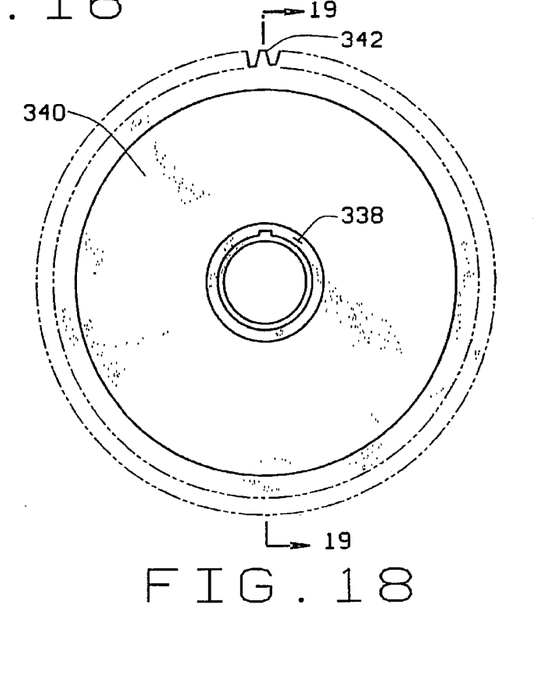
FIG. 18 is a side elevation view of a molded plastic gear of the invention with a radially planar side web that is relatively thin as compared with the width of the gear teeth; and, FIG. 19 is a sectional view taken along the line 19—19 of FIG. 18.

In the embodiment of the invention shown in FIGS. 16–19, the lubricant conducting ledge or scoop 312 has a slightly different configuration than that of the previously described embodiment. The ledge 312 is mounted on an interior surface of the gear housing cover 310 and projects outwardly from that surface as best seen in FIG. 17. As best seen in FIG. 16, the ledge 312 extends from the bearing side wall 314 with a proximal end 316 of the ledge adjoining the side wall and a distal end 318 of the ledge being positioned remote from the bearing 320 and vertically above the ledge proximal end. The ledge distal end 318 is also positioned vertically above the center axis 322 of the bearing and the gear shaft 324 mounted in the bearing. As in previous embodiments, the top surface 326 of the ledge functions as the lubricant conducting surface of the ledge. This surface 326 conducts lubricant deposited on the surface by rotation of the gears in the gear casing. The lubricant is conducted by the ledge to the access opening or aperture 328 passing through the bearing side wall 314 in substantially the same manner as the previously described embodiments of the lubrication system. This embodiment of the lubrication system also includes a pocket 330 between the ledge proximal end 316 and the bearing side wall 314. The pocket 330 functions in the same manner as the pockets of previously described embodiments of the ledge.

The ledge 312 of this embodiment differs from the previously described embodiments in that a portion 332 of the ledge projects axially from the ledge side edge 334. As seen in FIG. 17, the projecting portion 332 of the ledge has a generally rectangular configuration. This projection is specifically dimensioned to fit in close proximity into an annular void of the gear 336 mounted on the shaft 324 adjacent the ledge 312.

Figure 19:
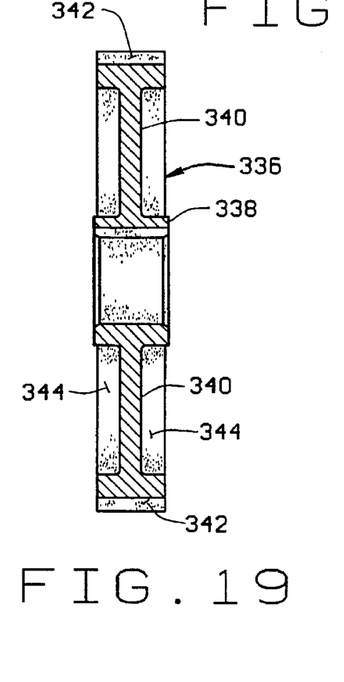

As best seen in FIG. 19, the gear 336 is formed with the center hub 338 having a generally cylindrical configuration. A circular web 340 projects radially from the periphery of the hub 338 to the gear teeth 342 surrounding the circumference of the gear. The gear teeth 342 have an axial width and project axially outwardly from the circular web 340 of the gear. This forms the annular void 344 between the periphery of the gear center hub 338 and the shaft 324 on which the gear is mounted, and the interior surface of the gear teeth 342.

The ledge projection 332 shown in FIGS. 16 and 17 is dimensioned to fit in close conformity into the annular void 344 between the gear hub 338 and the gear teeth 342. With this positioning of the ledge projection 332 relative to the gear 336, lubricant on the gear is more likely to be deposited on the lubricant conducting surface 326 of the ledge. This enhances the ability of this embodiment of the ledge 312 to receive lubricant from the gear rotation and convey that lubricant to the aperture 328 in the bearing side wall 314.

Although the ledge projection 332 is shown projecting into the annular void of the gear, it should be understood that the ledge will also work to lubricate the bearing when positioned adjacent a gear not having an annular void. In the preferred embodiment, it is only necessary that the ledge side edge have a shape that compliments the shape of the side of the gear and follows the side of the gear in close conformity.

A variation of the ledge projection 350 is shown in dashed lines in FIG. 16. This variant ledge projection 350 differs from the projection 332 only in that it curves or tapers upwardly slightly as it projects from the ledge side edge 334.

Also shown in FIG. 17 is a second ledge 346 positioned on the opposite side of the gear 336. The second ledge 346 is a mirror image of the previously described ledge 312 and functions in substantially the same manner to lubricate a second bearing 348 in which the shaft 324 is mounted for rotation. By properly positioning a lubricant conducting ledge having a projection such as those shown in FIG. 17 relative to a gear such as that shown in FIG. 17, the passive lubrication system of the invention may be employed in directing lubricant to shaft bearings positioned at various locations in a gear housing.

Numerous variations in the construction of the bearing lubrication system of this invention will occur to those skilled in the art in the light of the foregoing disclosure. Merely by way of example, the linear ledge of the spiral scoop can be curved to form an unattenuated spiral with an open mouth toward which the gear rotates. The unattenuated spiral scoop can be made higher than the bearing with which it is associated, and be positioned within the ambit of the rim of the embodiment of gear first described, that is not equipped with paddles. This will reduce the area of the scoop exposed to lubricant moving down the inner wall by gravity, but will increase the effectiveness of the promotion of movement of lubricant by the gear web. The angles of the ledges shown in the preferred embodiment can be varied, depending upon the lubricant and the speed at which the gears are driven. The viscosity and consistency of the lubricant must be such as to permit it to return to the sump by gravity, but with that limitation, the viscosity and consistency of the lubricant can vary. The shape of the housing can be varied. The lubrication system can be used with housings of different materials, the system itself supplying lubricant effectively. In the present embodiment, the input and output gears are preferably made of Acetal plastic, and the idler gear of Nylon. These provide quiet operation and long life. However, metal gears can be used, or other types of plastic or composite material. As has been indicated, the spiral of the scoop can be either a true spiral or an attenuated one. The scoops themselves are preferably made integral with the housing, but they may be inserted or otherwise mounted separately. The lubricant can be made thixotropic, particularly when there is intermittent use, which would tend to inhibit leakage through the seals when the gear reducer is idle. The term "unloaded" is not absolute. The main thrust of the shaft against the bearing is through an area removed from the opening, but because some bearing surface is still provided below the bottom edge of the bearing, the area of the bearing in which the opening is, need not be completely devoid of load. The term unloaded or non-loaded is used to signify that the main thrust of the bearing is elsewhere. Although the shafts of the gears in the preferred embodiment shown and described are arranged vertically in a line, the parallel shafts on which the gears are mounted need not be aligned vertically, as long as provision is made for the return to a sump or reservoir of the lubricant. The system of this invention has virtue for a single bearing, although its advantages are more apparent when a plurality or multiplicity of gears and bearings are involved. These variations are merely illustrative.

What is claimed is:

1. A bearing lubrication system comprising:

a cast housing having a housing wall with opposite interior and exterior surfaces;

a bearing cast as one piece with the housing wall, the bearing having a generally cylindrical configuration projecting from the housing wall interior surface for supporting a shaft for rotation in the bearing; and, a ledge cast as one piece with the housing wall, the ledge has a length with opposite proximal and distal ends and the length of the ledge and its opposite proximal and distal ends project in a cantilever manner from the housing wall interior surface with the ledge proximal end positioned adjacent the bearing and the ledge distal end positioned remote from the bearing and above the proximal end.

2. The lubrication system of claim 1, wherein:

the housing wall interior surface has at least one planar surface and the bearing and the ledge are both cast as one piece with the one planar surface.

3. The lubrication system of claim 1, wherein:

the ledge has a lubricant conducting surface and the conducting surface has a configuration that causes lubricant deposited on the conducting surface to move along the conducting surface toward the bearing by force of gravity acting on the lubricant.

4. The lubrication system of claim 1, wherein:

the bearing has a center axis and the proximal end of the ledge is positioned below the center axis.

5. The lubrication system of claim 1, wherein the bearing has a center axis and the proximal end of the ledge is positioned above the center axis.

6. The lubrication system of claim 3, wherein:

the lubricant conducting surface is positioned on an underside of the ledge.

7. The lubrication system of claim 5, wherein:

the ledge has a generally V-shaped configuration with a bottom terminus and the proximal end of the ledge is located at the terminus.

8. The lubrication system of claim 1 wherein:

the bearing has a sidewall surrounding a center opening of the bearing, the center opening is configured to receive a shaft for rotation therein, and an access opening extends through the sidewall to the center opening.

9. The lubrication system of claim 8, wherein:

the bearing sidewall access opening and the ledge are positioned relative to each other to cause lubricant deposited on the ledge to move from the ledge distal end toward the ledge proximal end and to the access opening.

10. The lubrication system of claim 9, wherein:

the bearing sidewall access opening is positioned above the ledge proximal end.

11. The lubrication system of claim 8, wherein:

the proximal end of the lubricant conducting surface adjoins the bearing sidewall.

12. The lubrication system of claim 7, wherein:

the ledge has a second lubricant conducting surface with opposite proximal and distal ends, the proximal end of the second conducting surface is located at the terminus of the ledge and is adjacent the bearing, and the distal end of the second conducting surfaced is remote from the bearing.

13. The lubrication system of claim 1, wherein:

the ledge has a width and projects outwardly from the housing wall to a side edge of the ledge, and the ledge extends upwardly as it extends across its width from the housing wall toward the side edge.

14. The lubrication system of claim 1, wherein:

a shaft having a center axis is mounted for rotation in the bearing and a gear is mounted on the shaft, the gear has gear teeth that extend axially across a periphery of the gear, and the ledge has a width that extends the ledge into an annular space between the shaft and the gear teeth.

15. The lubrication system of claim 14, wherein:

the ledge width extends upwardly as the ledge extends into the annular space between the shaft and the gear teeth.

16. The lubrication system of claim 1, wherein:

a shaft having a center axis is mounted for rotation in the bearing and a gear is mounted on the shaft, the gear has a center hub mounted on the shaft, a circular web that extends radially outwardly from the hub gear teeth extending around the web and having an axial width projecting the gear teeth axially beyond the web, and at least one paddle extending radially across the web between the hub and the gear teeth and projecting axially outwardly from the web, the paddle being positioned on the gear for transferring lubricant on the paddle to the ledge on rotation of the shaft and gear.

17. The lubrication system of claim 16, wherein:

the paddle is positioned on a side of the gear adjacent the ledge.

18. The lubrication system of claim 16, wherein:

the paddle is positioned on the gear to rotate past the ledge on rotation of the shaft and gear, the ledge has a curved configuration with a concave surface, the paddle has a curved configuration with a concave surface, and the paddle concave surface opposes the ledge concave surface as the paddle rotates past the ledge.

19. The lubrication system of claim 16, wherein:

the paddle has an axial width that projects the paddle axially beyond the gear teeth.

20. A bearing lubrication system for lubricating bearings in a gear housing from lubricant carried in the gear housing by rotating gears, the lubrication system comprising:

a housing having a housing wall with opposite interior and exterior surfaces, the interior surface having at least one planar surface area;

a bearing having a sidewall projecting from the at least one planar surface area of the housing wall, the bearing sidewall having a generally cylindrical interior surface configured to receive a shaft for rotation in the bearing sidewall; and, a ledge having a length with opposite proximal and distal ends, the length of the ledge and its proximal and distal ends projecting from the at least one planar surface area of the housing wall in a cantilever manner, the ledge being positioned adjacent the bearing for receiving lubricant carried in the housing by rotating gears and for conducting the lubricant to the bearing.

21. The lubrication system of claim 20, wherein:

the bearing sidewall has an aperture through the sidewall and the sidewall interior surface for conducting lubricant through the aperture to the sidewall interior surface for lubricating a shaft mounted for rotation in the sidewall interior surface; and, the ledge proximal end is positioned sufficiently close to the aperture to conduct lubricant from the ledge proximal end to the aperture.

22. The lubrication system of claim 20 wherein:

the housing is a cast housing and the bearing sidewall and the ledge are together cast as one piece with the housing wall.

23. The lubrication system of claim 21, wherein:

the ledge is positioned above the bearing aperture for conducting lubricant received on the ledge to the bearing aperture by force of gravity.

24. The lubrication system of claim 23, wherein:

the ledge has a general V-shaped configuration with a bottom terminus intermediate opposite ends of the ledge spaced upwardly from the terminus, the terminus being positioned above the bearing opening.

25. The lubrication system of claim 21, wherein:

the ledge has opposite proximal and distal ends, the proximal end is positioned adjacent the bearing and the distal end is positioned remote from the bearing and above the proximal end.

26. The lubrication system of claim 21, wherein:

the ledge adjoins the bearing sidewall and the aperture extends through a side of the bearing sidewall just above the ledge.

27. The lubrication system of claim 26, wherein:

a portion of the bearing sidewall is positioned between the aperture and the ledge.

28. The lubrication system of claim 21, wherein:

the ledge has a width and at least one side edge, and the ledge extends upwardly as it extends across its width toward the side edge.

29. The lubrication system of claim 21, wherein:

a shaft having a center axis is mounted for rotation in the bearing opening and a gear is mounted on the shaft, and at least one radial paddle projects axially from one side of the gear.

30. The lubrication system of claim 29, wherein:

the paddle is positioned on a side of the gear adjacent the bearing and passes adjacent the ledge on rotation of the shaft.

31. The lubrication system of claim 29, wherein:

the ledge has a concave surface and the paddle has a concave surface, and the concave surfaces of the ledge and the paddle pass in mutual opposition on rotation of the shaft.

32. The lubrication system of claim 29, wherein:

the gear has gear teeth that have an axial width, and the paddle projects beyond the axial width of the gear teeth.

33. The lubrication system of claim 21, wherein:

a shaft having a center axis is mounted for rotation in the bearing opening and a gear is mounted on the shaft, the gear has gear teeth that have an axial width, and the ledge projects into an annular space between the gear teeth and the shaft.

34. The lubrication system of claim 33, wherein:

the ledge extends upwardly as it extends into the annular space between the gear teeth and the shaft.

35. A bearing lubrication system for lubricating bearings in a housing with lubricant carried by rotating gears in the housing, the lubrication system comprising:

a housing;

a bearing within the housing;

a gear supported by the bearing in the housing for rotation of the gear relative to the bearing; and, a ledge in the housing, the ledge extending adjacent a side of the gear and toward the bearing, the ledge having a configuration for causing lubricant carried by the gear to be deposited on the ledge and to move along the ledge toward the bearing in response to rotation of the gear past the ledge, at least one paddle projects outwardly from the side of the gear and toward the ledge a sufficient distance to contact lubricant deposited on the ledge and push the lubricant along the ledge in response to rotation of the gear, the ledge has a concave surface and the paddle has a concave surface, and the concave surfaces of the ledge and the paddle pass in mutual opposition on rotation of the gear.

36. The lubrication system of claim 35, wherein:

the bearing and ledge are fixed in the housing with at least a portion of the ledge positioned above the bearing.

37. The lubrication system of claim 35, wherein:

the ledge has a general V-shaped configuration with a bottom terminus positioned intermediate opposite ends of the ledge, the opposite ends being spaced upwardly from the terminus, the terminus being positioned above the bearing.

38. The lubrication system of claim 35, wherein:

the ledge has opposite proximal and distal ends, the proximal end is positioned adjacent the bearing and the distal end is positioned remote from the bearing and above the proximal end.

39. The lubrication system of claim 35, wherein:

the bearing has a sidewall configured about an opening of the bearing and the gear is mounted on a shaft which is mounted for rotation in the bearing opening, and an aperture passes through the bearing sidewall and is positioned relative to the ledge for receiving lubricant moved along the ledge by rotation of the gear past the ledge.

40. The lubrication system of claim 39, wherein:

the ledge adjoins the bearing sidewall and the aperture extends through a side of the bearing sidewall just above the ledge.

* * * * *